United States Patent
Ungari et al.

(10) Patent No.: US 9,326,108 B2
(45) Date of Patent: *Apr. 26, 2016

(54) COMMUNICATION BETWEEN DEVICES USING TACTILE OR VISUAL INPUTS, SUCH AS DEVICES ASSOCIATED WITH MOBILE DEVICES

(71) Applicant: T-Mobile USA, Inc., Bellevue, WA (US)

(72) Inventors: Joseph Ungari, Seattle, WA (US); Maura Collins, Seattle, WA (US); Valerie Goulart, Seattle, WA (US); Andrea Small, Seattle, WA (US); Sinclair Temple, Seattle, WA (US); Patrick Carney, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 496 days.

This patent is subject to a terminal disclaimer.

(21) Appl. No.: 13/705,046

(22) Filed: Dec. 4, 2012

(65) Prior Publication Data

US 2013/0184015 A1 Jul. 18, 2013

Related U.S. Application Data

(63) Continuation of application No. 12/371,506, filed on Feb. 13, 2009, now Pat. No. 8,326,378.

(51) Int. Cl.
*H04M 1/00* (2006.01)
*H04W 4/12* (2009.01)
*H04M 1/725* (2006.01)
*H04M 19/04* (2006.01)

(52) U.S. Cl.
CPC ............ *H04W 4/12* (2013.01); *H04M 1/72547* (2013.01); *H04M 1/7253* (2013.01); *H04M 1/72544* (2013.01); *H04M 19/04* (2013.01)

(58) Field of Classification Search
USPC .................. 455/575.1, 41.2, 90.1, 90.2, 90.3
See application file for complete search history.

(56) References Cited

U.S. PATENT DOCUMENTS

| | | |
|---|---|---|
| 4,237,344 A | 12/1980 | Moore |
| 4,417,246 A | 11/1983 | Agnor et al. |
| 4,740,788 A | 4/1988 | Konneker |
| 5,006,983 A | 4/1991 | Wayne et al. |
| 5,347,306 A | 9/1994 | Nitta |
| 5,459,458 A | 10/1995 | Richardson et al. |

(Continued)

FOREIGN PATENT DOCUMENTS

| | | |
|---|---|---|
| WO | WO-9919854 | 4/1999 |
| WO | WO-2010093648 | 8/2010 |

OTHER PUBLICATIONS

International Search Report and Written Opinion: International Patent Application No. PCT/US10/23684, filed Feb. 9, 2010, Applicant: T-Mobile, mailed Apr. 1, 2010, 13 pages.

*Primary Examiner* — Douglas W Owens
*Assistant Examiner* — James H Cho
(74) *Attorney, Agent, or Firm* — Perkins Coie LLP

(57) ABSTRACT

A method and system for communication between users is described. In some examples, the system provides two or more dedicated communication devices that communicate with one another without voice-based or written communications. In some cases, the devices provide single input/out capabilities. In some cases, the devices provide multiple input/output capabilities.

19 Claims, 15 Drawing Sheets

(56) References Cited

U.S. PATENT DOCUMENTS

| | | | |
|---|---|---|---|
| 5,479,408 A | 12/1995 | Will | |
| 5,544,302 A | 8/1996 | Nguyen | |
| 5,587,706 A | 12/1996 | Branner et al. | |
| 5,644,627 A | 7/1997 | Segal et al. | |
| 5,651,049 A | 7/1997 | Easterling et al. | |
| 5,689,641 A | 11/1997 | Ludwig et al. | |
| 5,711,302 A | 1/1998 | Lampropoulos et al. | |
| 5,814,968 A | 9/1998 | Lovegreen et al. | |
| 5,970,122 A | 10/1999 | LaPorta et al. | |
| 5,978,770 A | 11/1999 | Waytena et al. | |
| 5,999,088 A | 12/1999 | Sibbitt | |
| 6,141,376 A | 10/2000 | Shaw | |
| 6,529,786 B1 | 3/2003 | Sim | |
| 6,956,497 B1 | 10/2005 | Hindus et al. | |
| 6,956,839 B2 | 10/2005 | Sexton et al. | |
| 7,697,925 B1 | 4/2010 | Wilson et al. | |
| 7,920,169 B2 | 4/2011 | Jung et al. | |
| 8,326,378 B2 | 12/2012 | Ungari et al. | |
| 2003/0011682 A1 | 1/2003 | Sellen et al. | |
| 2004/0204151 A1 | 10/2004 | Muthuswamy et al. | |
| 2004/0207542 A1 | 10/2004 | Chang et al. | |
| 2005/0120381 A1 | 6/2005 | Yamaguchi | |
| 2006/0125645 A1 | 6/2006 | Zittrain et al. | |
| 2006/0125928 A1* | 6/2006 | Wolcott et al. | 348/211.2 |
| 2007/0195373 A1* | 8/2007 | Singh | 358/302 |
| 2008/0130910 A1 | 6/2008 | Jobling et al. | |
| 2008/0146157 A1 | 6/2008 | Aaron | |
| 2009/0033630 A1 | 2/2009 | Thelen | |
| 2009/0300549 A1* | 12/2009 | Wang et al. | 715/835 |

\* cited by examiner

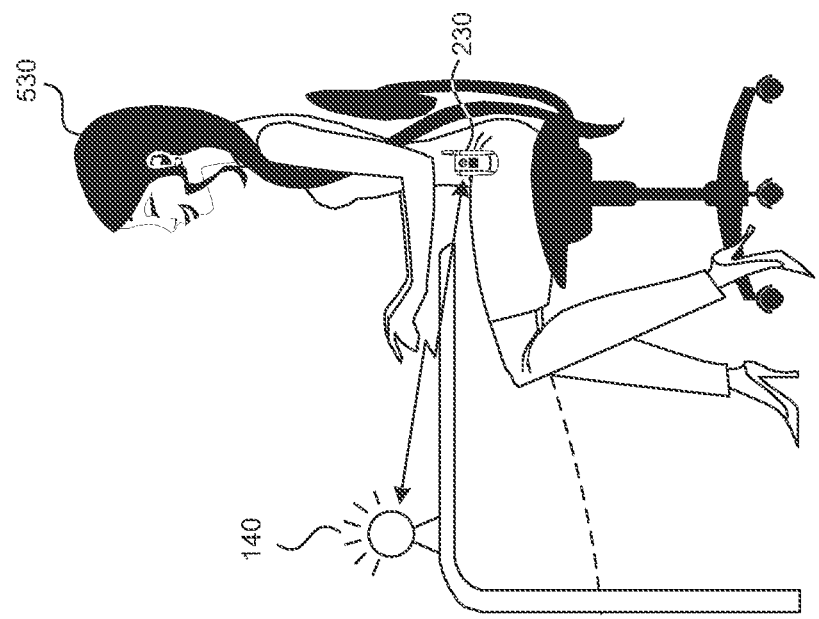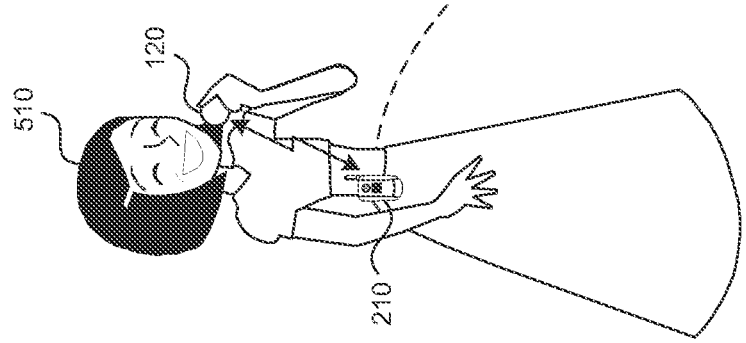
FIG. 5

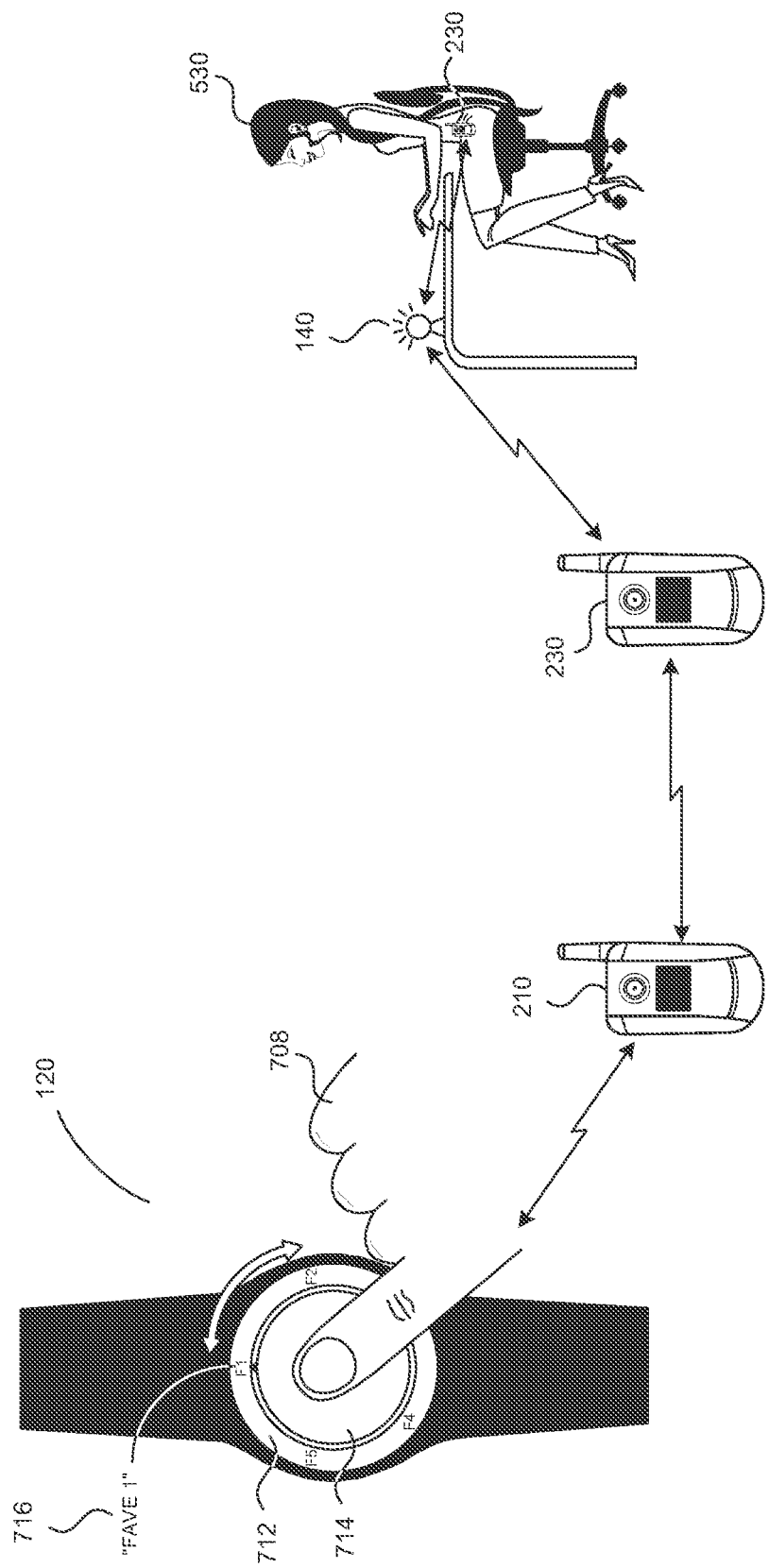

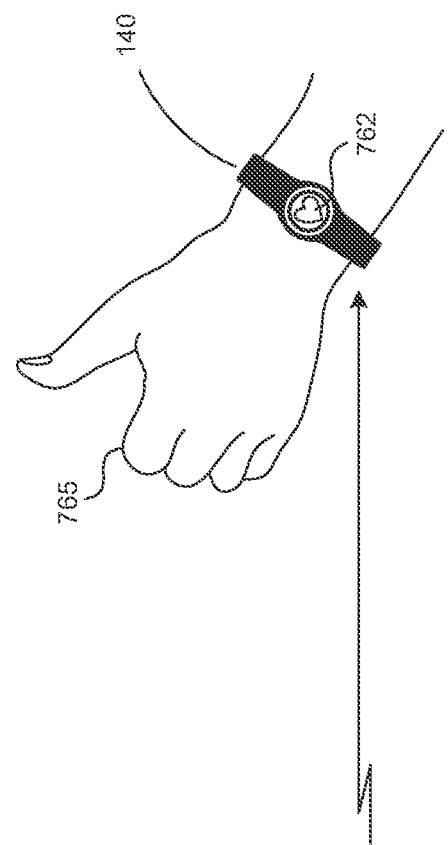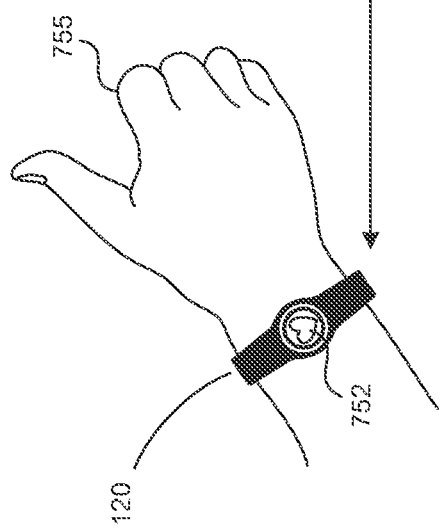
FIG. 7B

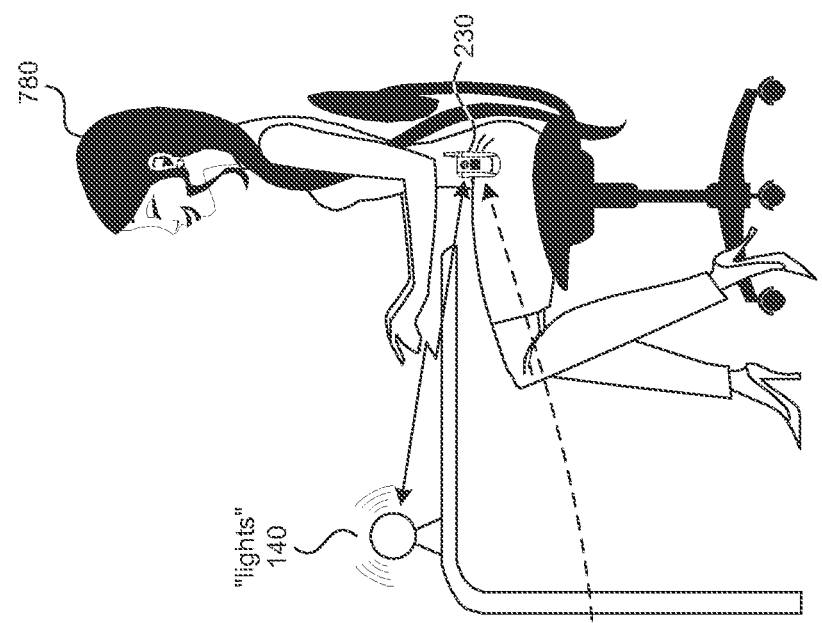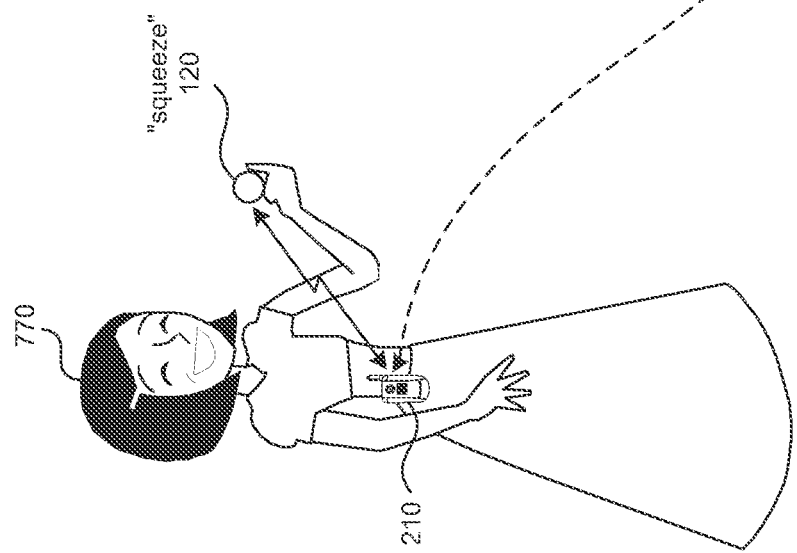
FIG. 7C

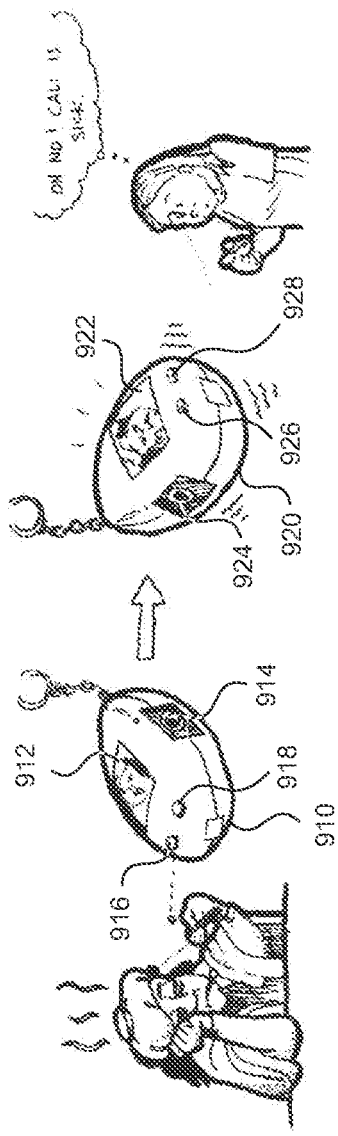
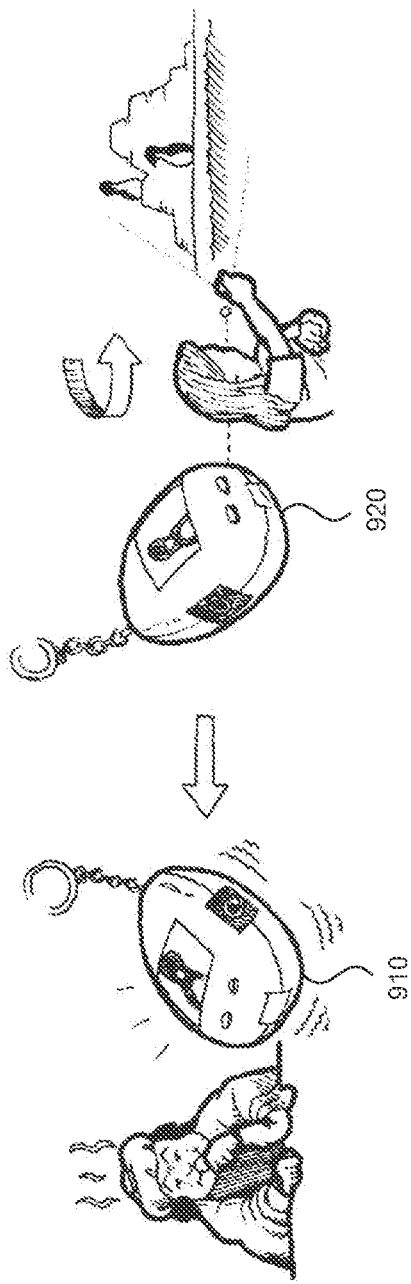

COMMUNICATION BETWEEN DEVICES USING TACTILE OR VISUAL INPUTS, SUCH AS DEVICES ASSOCIATED WITH MOBILE DEVICES

CROSS-REFERENCES TO RELATED APPLICATIONS

This application is a continuation application of U.S. patent application Ser. No. 12/371,506, filed on Feb. 13, 2009, and entitled "COMMUNICATION BETWEEN DEVICES USING TACTILE OR VISUAL INPUTS, SUCH AS DEVICES ASSOCIATED WITH MOBILE DEVICES," which is hereby incorporated herein in its entirety by reference.

BACKGROUND

Advances in technology facilitate and drive the ways in which people communicate with one another, specifically people in different locations. Voice communications over home telephones preceded voice communications over mobile telephones, which preceded voice communications over IP networks. Similarly, written communications over the mail preceded written communications over email, which preceded instant messaging and other avenues of sending short written communications (e.g., short messages over data channels). The trend is to automate what is done in the physical world (letters to emails) in order to provide users with rich, complex environments that expand their reach to other users.

Currently, mobile devices facilitate communication in a number of different ways: users can send email messages, make telephone calls, send text and multimedia messages, chat with other users, and so on. That is, the mobile device provides a user with a plethora of means for oral or written communication. However, there may be times when the user wishes to communicate in yet another fashion. Current mobile devices may not provide such capabilities.

The need exists for a method and system that overcomes these problems and progresses the state of the art, as well as one that provides additional benefits. Overall, the examples herein of some prior or related systems and their associated limitations are intended to be illustrative and not exclusive. Other limitations of existing or prior systems will become apparent to those of skill in the art upon reading the following Detailed Description.

BRIEF DESCRIPTION OF THE DRAWINGS

FIG. 5 is a schematic diagram illustrating a system for providing communication between users via single input/output communication devices.

FIGS. 7A-7C are schematic diagrams illustrating systems for providing communication between users via multiple input/output communication devices.

FIGS. 9A-9B are schematic diagrams illustrating a system for providing communication between users via dynamic input/output communication devices.

Figure 1:
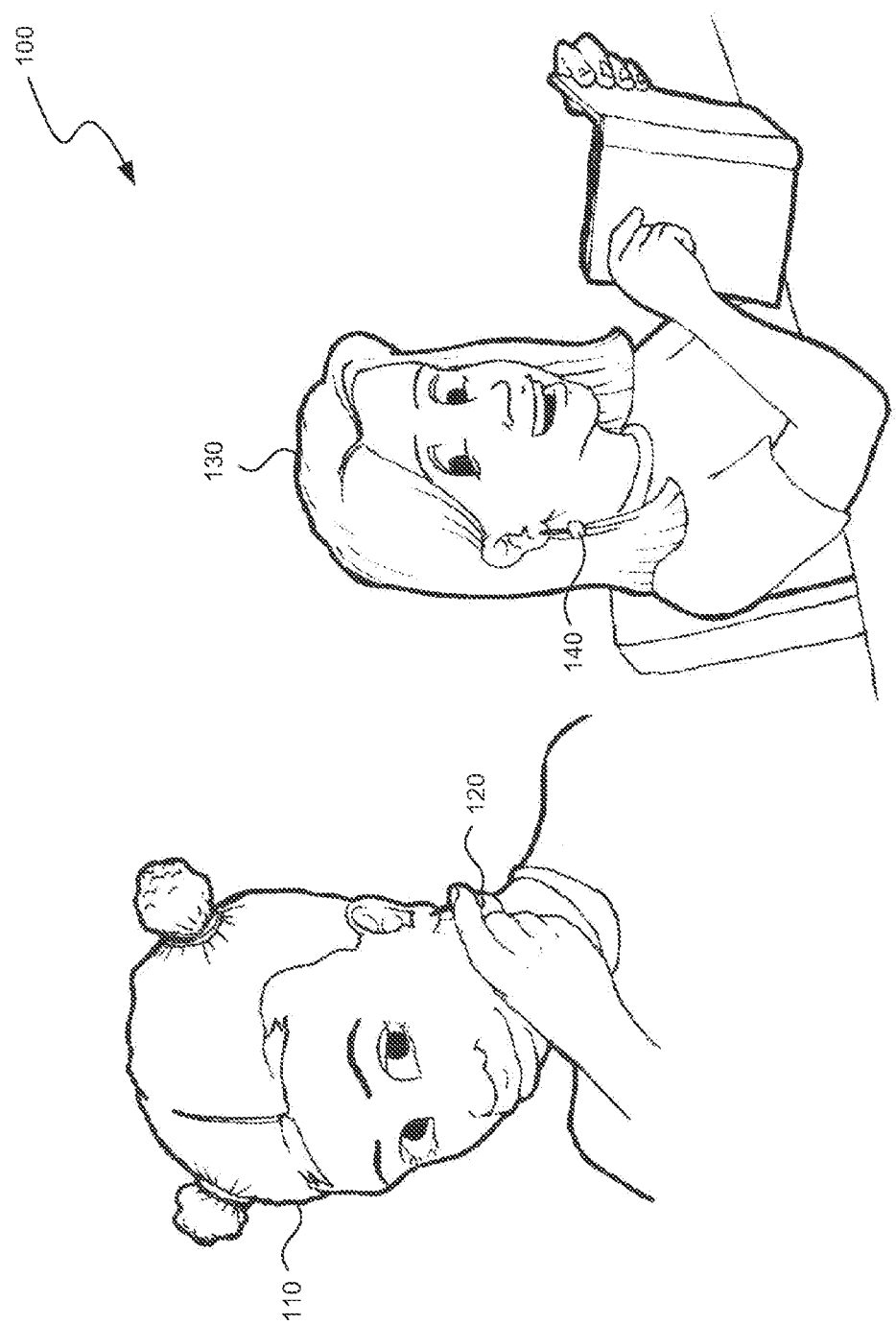
FIG. 1 is a pictorial diagram illustrating communication between users.

The headings provided herein are for convenience only and do not necessarily affect the scope or meaning of the claimed system.

DETAILED DESCRIPTION

The inventors have recognized the need for users to communicate at a low level to a friend or other person in an unobtrusive manner using a simple device. Such a device can be small and unitary, sized to be held within the hand of the user, and be manufactured inexpensively, such as providing substantially all electronic components on a single chip or single, monolithically integrated semiconductor substrate. The device would have a very limited function or feature set, including even the ability to provide only a single output based on a single input.

Possibly more importantly, the devices may communicate wirelessly over a long range, such as greater than one kilometer, by using existing wireless infrastructure, such as a wireless cellular network. Such devices can communicate directly with the wireless network, or communicate using a short-range wireless protocol to a cell phone or other mobile device, where that mobile device in turn communicates with the longer distance wireless network. By providing a small feature set and limited input/output, only a single signal (e.g., a control message) or small set of signals need be accommodated with such devices. Thus, such devices could use existing call setup signals employed in cellular telephone communications, use existing messaging in closed-power control under such cellular telephone protocols, and so forth. Thus, no new signals need be adopted, but instead existing signals under currently implemented wireless standards can be used to initiate a response on one device by another device.

Such devices may be packaged together as a pair or set, and sold as a unit, or sold individually and paired at a later time. For example, a wireless service provider may sell such paired devices at a retail location. The devices may have stored within their memory an associated electronic address or phone number with the other device in the set. In some cases, the devices may also readily accommodate the addition and storage of electronic addresses for devices outside of a paired device, in order to facilitate grouping of devices after purchase, among other benefits. Further, the wireless service provider can automatically provision wireless service for the devices so that they may operate within that wireless provider's network (or another network).

Overall, a system and method for providing communication between users is described herein. The system includes communication devices capable of receiving haptic or tactile user inputs and performing haptic, tactile, visual, and other non-voice based or non-text based outputs. The communication devices may be in pairs, may be within a group of three or more devices, or may stand alone. The communication devices may communicate directly with one another over a network, or may communicate to and/or receive instructions from mobile devices that communicate with one another over a network.

In some examples of the system, the communication devices are configured to receive a single input and to produce a single output. For example, a small, spherical device may be squeezed by a user, causing a second, similar device held by a second user to vibrate. The second user may then squeeze his/her device, causing the first device to vibrate. Thus, the single input/output communication devices facilitate communication between users without using voice or written communication.

In some examples of the system, the communication devices are configured to receive one or more multiple inputs, and produce one or more multiple outputs. For example, squeezing a first device may cause a second device to vibrate, while rubbing the first device may cause the second device to change color.

In some examples of the system, the communication devices include components capable of receiving dynamically changing inputs and producing dynamically changing outputs. For example, the first device may include a camera, and taking a picture using the camera may cause the second device to present the picture to a user. The second device may also alert the user about the picture, such as by vibrating, flashing, or by providing other alerts as described herein.

In some examples, paired and grouped communication devices may be similar in look, shape, and/or functionality. For example, the communication devices may be a set of earrings worn by two users, watches worn by two users, or small spheres carried by a group of users. In some examples, the communication devices may be different in look, shape, and/or functionality. For example, a first communication device may be an earring worn by a user, while a second communication device may be a sphere, vase, sculpture or other accessory on a user's desk.

Various examples of the system will now be described. The following description provides specific details for a thorough understanding and enabling description of these examples. One skilled in the relevant art will understand, however, that the system may be practiced without many of these details. Likewise, one skilled in the relevant art will also understand that the system incorporates many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the system. Indeed, certain terms may even be emphasized below; however, any terminology intended to be interpreted in any restricted manner will be overtly and specifically defined as such in this Detailed Description section.

Suitable System

As discussed herein, the system facilitates communication between users that is not oral or written. The system may facilitate communication of a non-verbal or silent signal, gesture, or feeling. Referring to FIG. 1, a schematic diagram 100 illustrating non-verbal communication between users is shown. A first user 110 wears a communication device 120 in the form of an earring. The first user wants to let her friend, a second user 130, know that she is thinking of her. She squeezes her communication device 120. The communication device 120 transmits information to a communication device 140 (also an earring) associated with the second user 130, causing the communication device 140 to vibrate and informing the second user 140 that her friend is thinking of her. The second user 140 may squeeze her communication device 130, causing her device to transmit information back to the communication device 120 associated with the first user. Upon receipt, the communication device 120 may vibrate, informing the first user 110 that the second user 130 received her communication. Of course, this scenario is one of many possible scenarios contemplated by the system, some of which will be discussed in detail herein.

Figure 2A:
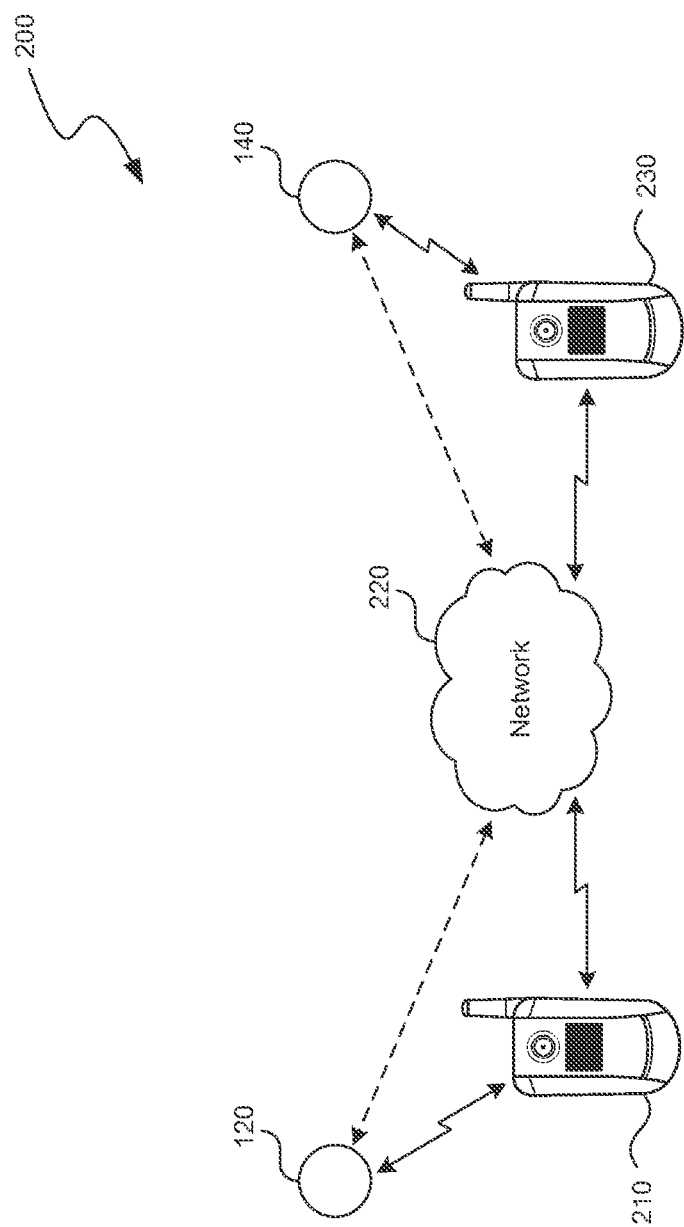
FIG. 2A is a block diagram illustrating a suitable system for providing communication between users via haptic/visual communication devices.

Referring to FIG. 2A, a block diagram illustrating a suitable system 200 for providing communication between users via haptic/visual communication devices is shown. Aspects of the system may be stored or distributed on tangible computer-readable media, including magnetically or optically readable computer discs, hard-wired or preprogrammed chips (e.g., EEPROM semiconductor chips), nanotechnology memory, biological memory, or other data storage media. Alternatively or additionally, computer implemented instructions, data structures, screen displays, and other data under aspects of the system may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

The system 200 includes a first communication device 120 associated with a first mobile device 210, a second communication device 140 associated with a second mobile device 230, and a network 220 that provides a communication link between the two mobile devices. Alternatively, or additionally, the two communication devices may communicate directly via the network. The system 200 may include components within the network 220 that facilitate communications between devices. For example, the network 200 may include components that modify or adjust the functionality of the devices on the network, such as how devices perform based on received inputs. Further details are discussed herein. Of course, the system 200 may include more communication devices, or may only include one communication device. Mobile devices 210, 230 may be a cell phone, laptop, PDA, smart phone, and so on. Alternatively, or additionally, the system may associate the communication devices 120 and 140 with other devices, such as desktop computers, servers, and so on.

Figure 2B:
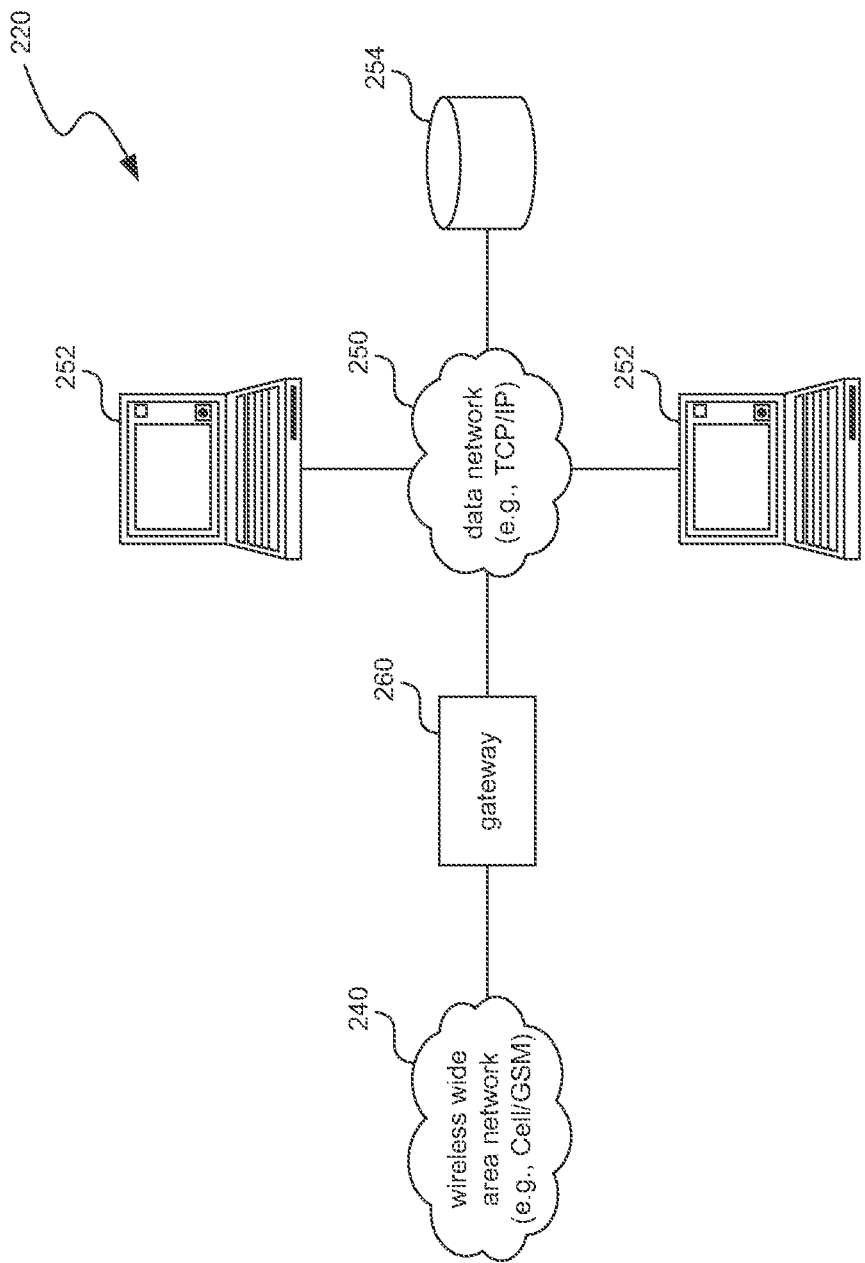
FIG. 2B is a block diagram illustrating suitable components within the network of FIG. 2A

Referring to FIG. 2B, a block diagram illustrating suitable components within the network 220 is shown. The network 220 may include a cell or GSM-based network 240 that communicates with an IP-based network 250 via a gateway 260. The IP-based network 250 may include or communicate with one or more user computing devices 252, a database 254, and so on. The user computing devices 252 may display and/or present information to users of the communication devices described herein, such as information stored in the database 254. Examples of presented information include: information related to a service plan for the communication devices, information related to previous or recorded communications using the devices, information related to modifying or changing parameters associated with the communication devices, and so on. Further details are discussed herein.

The network 220 may include any network capable of facilitating communications between devices, and is not limited to those shown in FIG. 2B. Examples include GSM (Global System for Mobile Communications), UMA/GAN (Unlicensed Mobile Access/Generic Access Network), CDMA (Code Division Multiple Access), UMTS (Universal Mobile Telecommunications System), EDGE (Enhanced Data for GSM Evolution), LTE (Long Term Evolution), Wimax (Worldwide Interoperability for Microwave Access), Voice Over Internet Protocol (VoIP), TCP/IP, and other technologies. Thus, unlike previous systems of paired devices (walkie-talkies, and so on) that are limited to short distance communications, the system 200 enables communications over longer distances (e.g., 1 km or more).

In some cases, the cell-based networks 240 incorporate picocells, small base stations having short wireless ranges and generally located in residential or business locations to provide local coverage to that location. Picocells may be directly connected to a network, and often appear as cell sites having a Cell Global Identity (CGI) value within the network.

In some cases, the IP-based networks 250 (e.g., UMA networks) incorporate femtocell networks. Similar to VoIP, in femtocell networks voice communications are packetized and transmitted over the Internet. UMA networks typically feature WiFi access points for receiving and sending voice communications over an unlicensed spectrum; femtocell networks typically feature wireless access points broadcasting within licensed spectrums of a telecommunications service provider, with conversion of voice communications into IP packets for transmission over the Internet.

Figure 3:
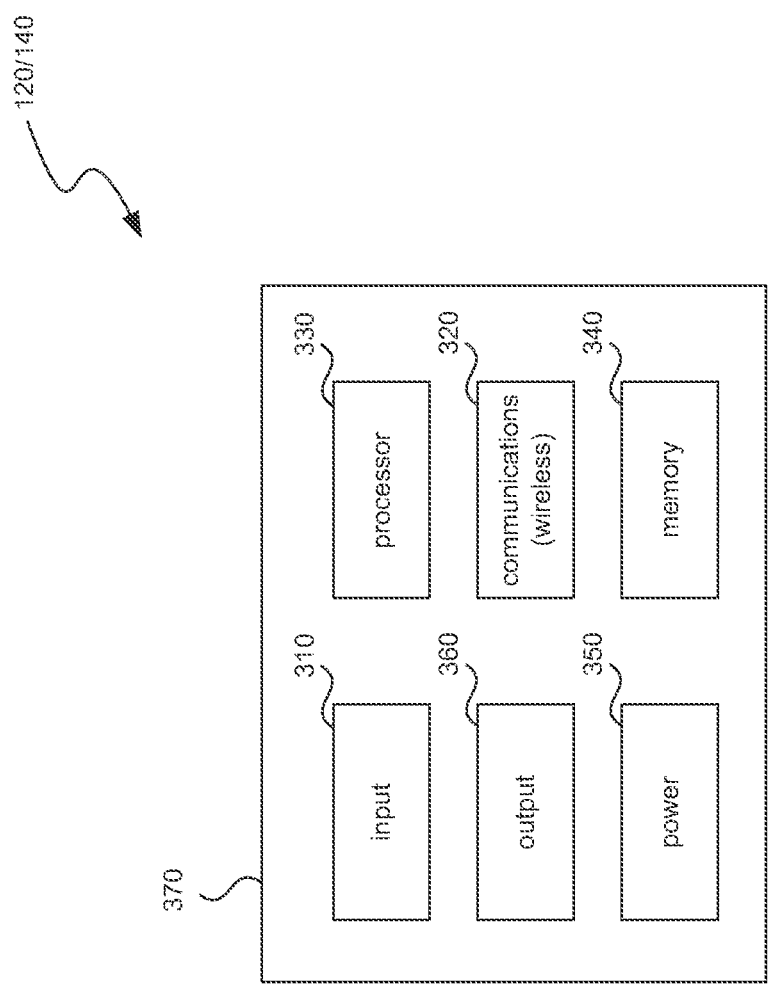
FIG. 3 is a block diagram illustrating suitable components for a haptic/visual communication device.

The first and second communication devices, and other communication devices described herein may exchange messages, data, or information directly between one another, or via associated mobile devices. Referring to FIG. 3, a block diagram illustrating suitable components for a haptic/visual communication device 120, 140 is shown. The device 120, 140 includes an input component 310 capable of facilitating or receiving user input and identifying or determining a message or other information to be transmitted based on the received input, as well as an output component 360 capable of performing one or more actions in response to receiving an indication (such as a message from a paired device or from a network component).

The input component 310 may be configured in a variety of different ways, depending on the type or functionality of the communication device. In some cases, the communication device performs a single function, and the input component facilitates reception of a single type of input. For example, the communication device may be a small sphere, and a squeeze of the housing of the sphere provides the input to the device. Thus, in some cases, the communication device is a small, inexpensive device only containing components required to receive an input, transmit a message, receive a message, and perform a single action. For example, a small, inexpensive device may only contain a touch sensor (to detect a tactile input), a series of logic gates (to process the tactile input), a radio (to transmit a message in response to a detected input), and a battery to power the device.

In other cases, the communication device performs more than one function, and the input component facilitates reception of multiple types of input or dynamically changing inputs. For example, the input component may be a touch screen that receives many different inputs based on how the user touches the screen, what gestures the user makes on the screen, and so on. The input component may also be a component that facilitates selection of communication devices, multiple inputs, actions to be performed at other communication devices, and so on. Example input components include user interface components (such as touch screens), rotation components, other tactile-based components, buttons and other selection components, and so on.

The input component may facilitate the reception of multiple inputs via a single type of input mechanism, or via multiple types of input mechanisms. Different inputs, variations of inputs, and/or combinations of inputs may result in sending different messages, and thus causing different outputs at other communication devices. For example, reception of a light squeeze could result in a blue light being displayed at a paired device, whereas a strong squeeze could result in a red light at the paired device. Thus, the strength of squeeze, in addition to the act of squeezing, may correspond to the output. As another example, the duration may also affect the output. A quick squeeze may result in a purple light, but a long squeeze may result in a green light. In addition, combinations of input mechanisms, such as a quick, strong squeeze, may produce certain results at paired devices. Further details regarding different types of communication devices and input components are described herein.

The output component 360 may also be configured in variety of ways, depending on the type of functionality of the communication device. In some cases, the communication device performs a single action, and the output component facilitates performance of a single action. For example, the communication device may vibrate. In other cases, the communication device performs more than one action, depending on what types of messages or communications are received by the device. For example, receipt of one message may cause the device to vibrate, while receipt of a different message may cause the device to blink, while receipt of both messages may cause the device to blink and vibrate. In some cases, the output component is integrated into the device with the input component, such as via a touch screen or other user interface component.

The communication device 120, 140 also includes a communication component 320 configured to communicate information, messages, and/or other data to other communication devices, to associated mobile devices, to other devices within an affiliated network, and so on. The communication component 320 may transmit messages over various signaling, control and/or messaging channels, such as short message channels, signaling control channels, access command channels, and so on. For example, the communication component 320 may transmit Short Message Service (SMS) messages, multimedia service (MMS) messages, Subsystem Numbers (SSN), International Mobile Subscriber Identity (IMSI) messages, Unstructured Supplementary Service Data (USSD) messages, and so on. In some cases, the communication component 320 includes components capable of communicating over wireless personal area networks (WPANs), including communications over IEEE 802.15 (both high rate and low rate), Bluetooth PAN, piconets, ZigBee, nearfield communications, peer to peer networks, mesh networks, and so on.

In some examples, two communication devices are paired with one another and are configured to only communicate with one another. In these examples, the communication components 320 of the devices may send simple control messages to one another to prompt the other device to perform an action. That is, one device may be configured to only send a simple control message to a single address associated with another device, and be configured to only receive a simple control message from the other device. Thus, effectively no additional bandwidth need be allocated for such devices, since such small messages (less than one kilobyte) are sent.

In some examples, a communication device may communicate with a network component, such as a component within the cell network 240, that receives messages, extracts the contents of the message (or, merely recognizes the sender of the message via header or other information), and transmits a messages to a paired device based on the receipt of the message.

The information, or messages, may be stored in an optional memory component 340, along with a data structure or map that relates messages with types of input received by the communication device. In some cases, the communication component 320 is a radio capable of transmitting messages over a cellular network, such as those described herein. In some cases, the communication component 320 is a Bluetooth component capable of transmitting information to an associated mobile device (e.g., devices 210, 230) that prompts the mobile device to transmit messages to other devices. For example, a device pairs with a mobile device and uses one of several know Bluetooth profiles to communicate. In some cases, the communication component 320 is a WiFi component or other IP-based component capable of transmitting data packets over a wireless channel to an associated mobile device or to other devices within a network. Of course, the communication component 320 may include some or all of these components.

The memory component 340 may include, in addition to a data structure mapping messages with types of received input and/or actions to be performed, information identifying what devices are paired or grouped with the communication device 120, 140. For example, the information may identify names of grouped devices, IP addresses of grouped devices, other addresses associated with grouped devices, and so on. The following tables illustrate types of information stored in various communication devices.

For a paired communication device, the table may store information relating a reception address (for messages from the paired device) with the action to be performed:

TABLE 1

| Reception Address | Action to be Performed |
|---|---|
| "address1" | Vibrate housing/device |
| "address2" | Change emitted/displayed color |

For a paired communication device, the table may store information relating a received input with a message to be sent to the paired device:

TABLE 2

| Received Input | Message to be Sent |
|---|---|
| Housing is squeezed | "Message1" |
| Housing is rubbed | "Message2" |

For a communication device within a group of devices, the table may store information relating received messages with actions to be performed:

TABLE 3

| Received Message | Action to be Performed |
|---|---|
| "message1/user1" | Emit blue light |
| "message1/user2" | Emit blue light and blink |
| "message2/user1" | Emit red light |
| "message2/user2" | Emit red light and blink |

In some examples, the system dynamically controls and adjusts the performed actions based on a number of factors. For example, the system may include prediction components that monitor and adjust the performance actions based on a prediction of a user's behavior to an input into the system. The system may review historical information related to user behavior, historical information related to the behavior of other users associated with the user, historical information related to other users on a network, and so on.

The communication device 120, 140 may also include other components that facilitate its operations, including processing components 330, power components 350, additional storage components, additional computing components, and so on. The processing component 330 may be a microprocessor, microcontroller, FPGA, or a simple set of logic gates. The power component 350 may be a replaceable battery, a rechargeable battery, a solar-powered battery, a motion-generating component, a capacitor-based component, inductor-based component, and so on. Of course, the communication device 120, 140 may include other components, such as GPS components, cameras and other accessories, other input and output components (such as audio or visual components), and so on. Some or all of the components in the devices may be manufactured inexpensively on a chip, or on a single semiconductor substrate.

A housing 370 for the communication device 120, 140 may facilitate user input to the device, as described herein. For example, the housing 370 may include material capable of being squeezed, rubbed, turned, and so on, and configured to transmit an indication of such an action to the device. The housing 370 may be part of the input component 310 or may cause the input component to perform an action, such as identify and transmit a message to another communication device across the network. Also, the housing 370 may be configured to output information to a user. For example, the housing 370 may change color, blink, or change intensity of light when the device is in communication with other devices, may vibrate when the device receives a prompt from another device, may slightly expand or contract, may change temperature, and so on. Further details regarding types of actions performed by the communication device are discussed herein.

The housing 370 may include elements that enable the communication device to be wearable by a user. For example, the housing 370 may include components that facilitate being worn on a belt buckle, backpack, necklace, or any number of on-or-near-body-location garments and accessories. The housing 370 may also include key fobs, mobile phone straps or dongles, and other attachment components.

Figure 4:
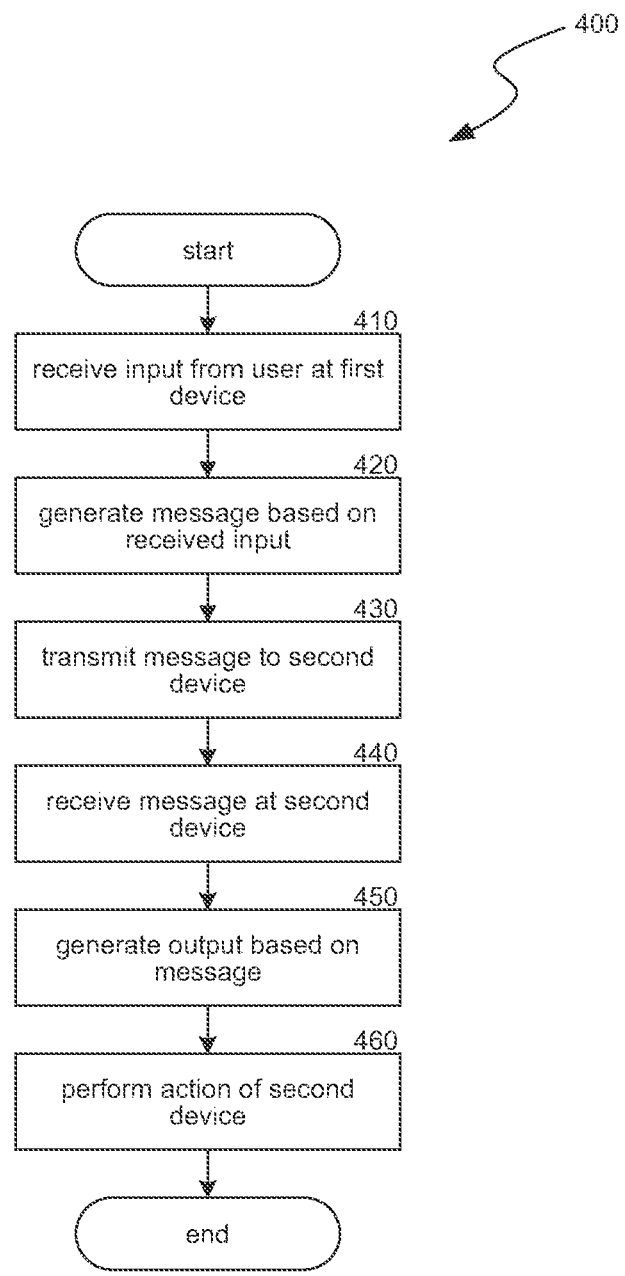
FIG. 4 is a flow diagram illustrating a routine for providing communication between users via haptic/visual communication devices.

As discussed herein, the communication device may communicate directly with other communication devices, or may leverage mobile device networks (such as a network associated with a user's mobile phone service plan). Referring to FIG. 4, a flow diagram illustrating a routine 400 for providing communication between users via haptic/visual communication devices on a network is shown. Before performing routine 400, a device may register with a network or an associated mobile device. For example, upon purchase at a retail store, the device may be preprogrammed with one or more electronic addresses associated with another device, using any known means. In one instance, a point of sale device may scan a bar code associated with packaging for the device to obtain a serial number associated with a serial number stored in the device, and then a salesperson or purchaser may input a corresponding electronic address for another or paired device (phone number, URL, email address, etc.), into a terminal or computer, such as the computer 252 connected to the network 250. Alternatively or additionally, powering up a communication device may cause the device to transmit a GSM registration message to an associated network, or may cause the device to communicate with a mobile device via a Bluetooth connection.

In step 410, a first communication device receives input from a user. Using the system shown in FIG. 2 as an example, the communication device 120, a small sphere attached to a first user's keychain, is squeezed by the first user. In step 420, the communication device 120, via an input component 310, generates or selects a message based on the received input. In the example, the device 120 reviews a table relating types of input with messages (e.g., Table 2), and selects a message corresponding to a squeeze of the device. In step 430, the device transmits the message to a second device. In the example, the device may transmit the message directly to communication device 140, over the network 220, or may prompt the mobile device 210 to send a message (such as an SMS) to mobile device 230, which then directs the message to the communication device 140.

In step 440, the second communication device receives the message. In the example, the communication device 140 may receive the message directly from the communication device 120, or from the associated mobile device 230 (such as via a Bluetooth connection). In step 450, the second communication device generates an action to be performed (e.g., Table 1). In the example, the communication device 140 reviews a table that associated received messages with actions to be performed (outputs), and selects an action associated with the received message. For example, the communication device 140 selects "vibration" as the action to be performed. In step 460, the second communication device performs the action. In the example, the communication device 140 vibrates, alerting a second user associated with the communication device 140, that the first user was thinking of his/her, or communicating a private message to the second user only known to the second user.

Communication Between Single Input/Output Devices

In some examples, the system includes devices configured to only receive one input and/or produce one output. Referring to FIG. 5, a schematic diagram illustrating a system 500 for providing communication between users via single input/output communication devices is shown. The system 500 includes a first communication device 120 having single input/output functionality and an associated mobile device 210 located at a first user 510. The system 500 also includes a second communication device 140 having single input/output functionality and an associated mobile device 230 located at a second user 530. In FIG. 5, the first communication device 120 is a small sphere held by the user 510, and the second communication device 140 is a larger sphere located on the second user's desk. Of course, the system 500 may include additional or other types of devices, or may only include one of the devices. The flow of communications is now discussed.

Figure 6:
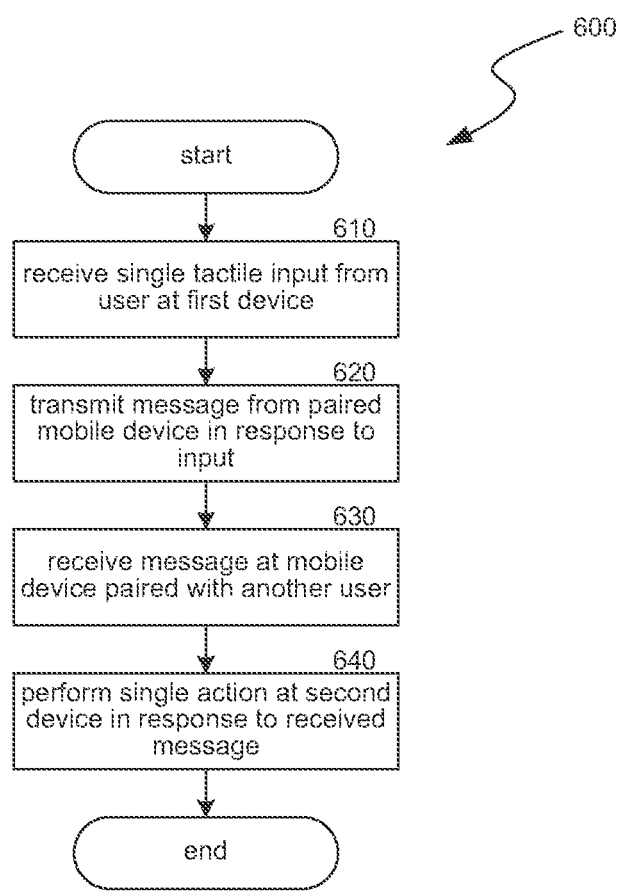
FIG. 6 is a flow diagram illustrating a routine for providing communication between users via single input/output communication devices.

Referring to FIG. 6, a flow diagram illustrating a routine 600 for providing communication between users via single input/output communication devices is shown. In step 610, a first device receives a single, tactile input from a user. For example, the device is squeezed or rubbed by the user, or an input component is selected by the user. In step 620, the first device causes an associated mobile device to send a message to another user. For example, the device communicates with an associated mobile device over a Bluetooth connection, causing the associated mobile device to transmit an SMS to the other user. The mobile device may be preprogrammed with a number or address associated with the other user. In step 630, the transmitted message is received at a different mobile device associated with a different user. In step 640, a second device performs a single action in response to the received message. For example, the mobile device that received the message communicates with the second device over a Bluetooth connection causing the second device to change from a red color to a blue color. The user of the second device can then return the message, by tapping his/her device, which, using a similar method, causes the first device to vibrate.

Thus, the system includes two or more devices, where each device is configured to receive one, and only one, input, and perform one, and only output, with respect to one another. Of course, other configurations may be possible. For example, the system may include only one device, or may include many devices that each perform a unique, but single, action in response to receiving communications from one of the other devices.

For example, the system includes a single, stand-alone communication device that communicates with an associated mobile device. The device may be a ball or other apparatus that performs an action based on communications received at the associated mobile device. For example, a user may be working at his/her desk, and receive a call from his/her boss. The call may prompt the mobile device to transmit a message to the ball, causing the ball to change from a (soothing) blue color to a (slightly less soothing) red color.

Communication Between Multiple Input/Output Devices

In some examples, the system includes devices configured to receive multiple inputs and/or produce multiple outputs. Referring to FIGS. 7A-7C, schematic diagrams illustrating systems for providing communication between users via multiple input/output communication devices are shown. In one example, FIG. 7A shows a system having a first device 120 associated with a user 708. The first device 120 includes a rotation input component 712, and a touch screen input component 714. The rotation component 712 facilitates the reception of multiple inputs. For example, the user may select a second user 716 (that is, the ID for a device associated with the second user) from among, e.g., five preprogrammed device IDs/network addresses, using the rotation component, and may then select one or more actions to be performed at the second user's device 140 using the touch screen component 714, which causes a corresponding signal to be sent based on the stored table. In other words, a user rotates a dial on the device (in this example, a wristwatch), to select one of five previously selected destination numbers/addresses, and then inputs one of a small set of input commands or strokes on the touch-sensitive display (e.g., downward, upward, left or right strokes), and a corresponding signal is sent to the selected destination number/address.

The first device 120 is associated with a mobile device 210, which may communicate messages to other devices within a network, such as a second device 140 associated with a mobile device 230 owned by a user 742. The second device 140 may perform multiple actions, such as display different colors, blink or vary the intensity of the displayed colors, and so on.

In another example, FIG. 7B shows a first device 120 associated with a first user 755 in communication with a second device 140 associated with a second user 765. In this example, the two devices are paired, and communicate with one another directly. The input components, in this example touch screens 752, 762, provide for an unlimited number of inputs that can be received by the devices. For example, the user 755 may draw a heart using the input component 752 of the first device 120, and transmit the heart to the second user 765, which is displayed on the input component 762 of the second device 140.

In another example, FIG. 7C shows a first device 120 associated with a mobile device 210 of a first user 770 in communication with a mobile device 230 and second device 140 associated with a second user 780. The first user may send a number of different messages, depending on what he/she inputs to the device. For example, squeezing the first device 120 may cause the second device 140 to light up, while tapping the first device may cause the second device to vibrate, and so on. The functional operation of these and other similar communications are now discussed.

Figure 8:
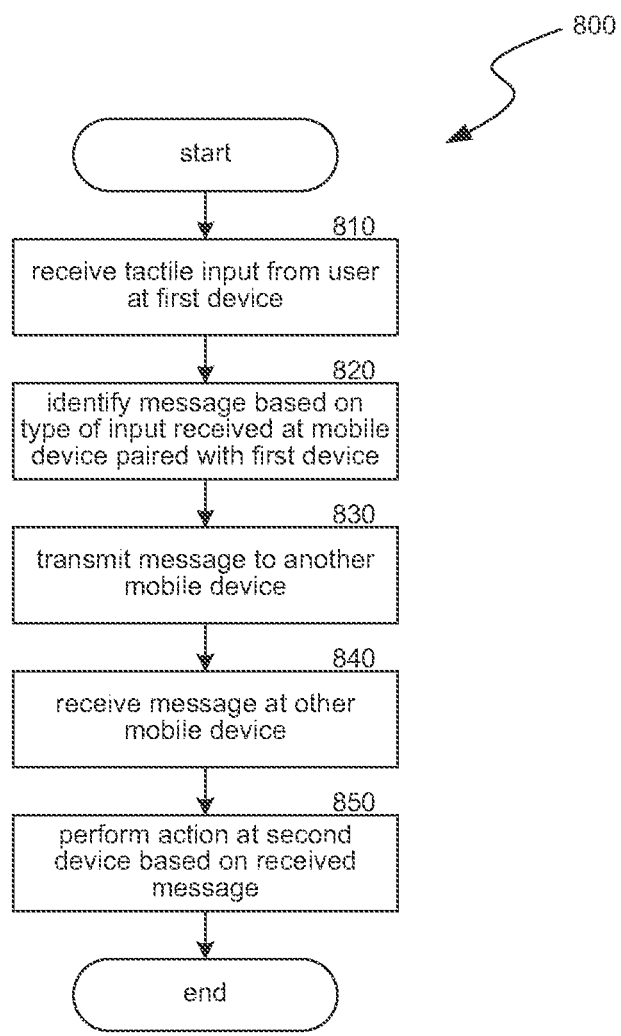
FIG. 8 is a flow diagram illustrating a routine for providing communication between users via multiple input/output communication devices

Referring to FIG. 8, a flow diagram illustrating a routine 800 for providing communication between users via multiple input/output communication devices is shown. In step 810, a first device receives a tactile input from a user. For example, the user may squeeze, rub, or press the housing of the first device. In step 820, the device identifies a message to be sent to a second device based on the received input. For example, the device looks to a table that associates received inputs with types of messages, and identifies a message to be sent based on the received input. In step 830, the first device transmits the message to a second device. For example, since the message is quite small (e.g., <1 kB) the first device is paired with a second device, and transmits the message to the second device via a signaling and/or control channel.

In step 840, the second device receives the message. The second device, may, depending on the functionality provided by the device, select an action to be performed based on the received message. In step 850, the second device performs an action associated with the message. For example, the second device vibrates in the user's hand upon receiving the message. The user can then return the message, by tapping his/her device, the second device 140, which, using a similar method, causes the first device 120 to also vibrate, or can squeeze his/her device 140, causing the first device 120 to change colors.

The system may include many different types of devices that facilitate receiving multiple inputs and/or performing multiple actions. Examples include watches, jewelry, accessories, garments (e.g., scarves, hats, gloves), attachments to mobile devices, stand alone devices (such as globes, lamps, vases, and other desk or home accessories that also perform their normal functions), digital picture frames, and so on. For example, a watch worn by a user may be rubbed in one direction to provide one input, and rubbed in a second direction to produce another input. The intensity or number of user movements on a first user's watch may correlate to the intensity of a color shown via a second user's desk lamp. Complex movements performed by users at a first device may produce a sequence of actions at a second device. For example, a user may input a number of different gestures at the first device, which may cause the second device to present a sequence of colors to a user.

Communication Between Dynamic Input/Output Devices

In some examples, the system includes devices configured to receive dynamic or new inputs and/or produce dynamically changing outputs. In some examples, these devices communicate with one another without the use of communication components typically used in current mobile device technology. The devices may only include an input component, a memory component capable of only storing one input, and an output component capable of only performing a single action. In some example, these devices are paired with one another and sold together. Each device may be configured to only communicate with one another. They would not include a speaker or microphone, and may not provide voice or text based communications.

Referring to FIGS. 9A-9B, schematic diagrams illustrating a system for providing communication between users via dynamic input/output communication devices are shown. FIG. 9A shows a first user, with a first device 910, taking a picture of herself while sick. The first device 910 includes a user interface 912, which is capable of presenting images to the user, receiving tactile input, and so on. The first device 910 also includes a camera 914, and two buttons 916, 918 which may operate the camera, the user interface, the power to the device, and so on. The first device 910 is paired with a second device 920, similar to the first device. The second device, associated with a second user, also includes a user interface 922, a camera 924, and two buttons 926, 928. In FIG. 9A, the first user takes a picture using the first device 910, and the first device, automatically or when prompted, transmits the picture to the second device 920, for viewing by the second user, using, e.g., MMS. A press of a button 916, 918, the act of taking the picture, and/or selecting the picture via the interface 912 may cause transmission of the picture from one device to another. Or, pressing button 916 takes a picture, and pressing button 918 transits the picture to the second device 920. In some cases, the picture may remain on both screens until replaced, showing the same image to both users.

In FIG. 9B, the second user takes a picture, in this case a picture of penguins (to cheer up her sick friend), and transmits the picture to the first user via the two devices. Again, the same series of inputs may initiate transmission of the picture. Thus, the system, a pair or group of similar devices, enables users to quickly communicate with one another without requiring voice-based or written communications. In fact, no voice channel, or voice communication capabilities are required, and in some cases, are not provided by the devices 910, 920. The flow of these communications is now discussed.

Figure 10:
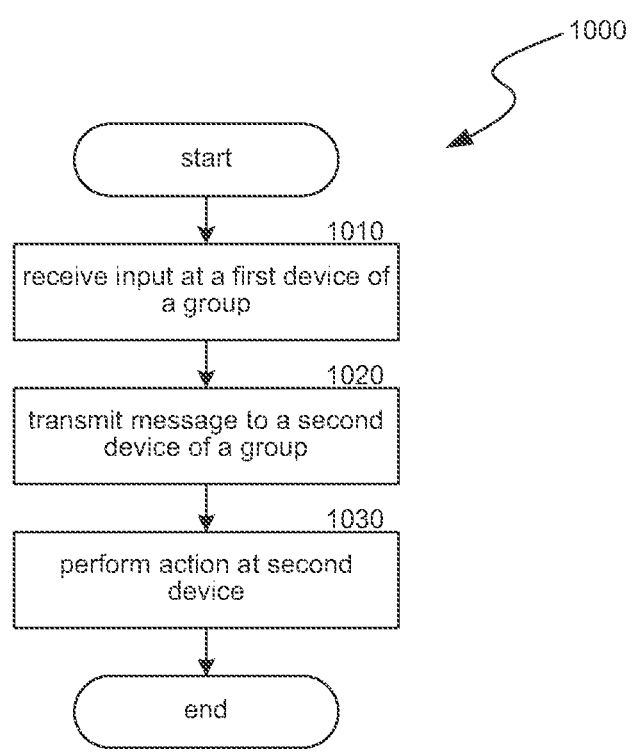
FIG. 10 is a flow diagram illustrating a routine for providing communication between users via dynamic input/output communication devices.

Referring to FIG. 10, a flow diagram illustrating a routine 1000 for providing communication between users via dynamic input/output communication devices is shown. In step 1010, a first device of a group of similar and dedicated devices receives an input. For example, a user takes a picture using a digital camera of the first device. The taking of the picture may be considered a dynamically changing input, because the device has never received such an input before (that exact picture). In step 1020, the first device transmits the picture to a second device within the group, e.g., as an MMS message. For example, the user may press a first button to take a picture, which is displayed, and if acceptable, press a second button on the first device causing transmission of the picture to the second device. The first device may send a message containing information associated with the picture over a data channel. In step 1030, the second device performs an action, such as displaying the picture. A second user may then take a picture and send the picture back, or may modify the picture and send the modified picture back, or provide other inputs. For example, the viewing screen may be a touch screen, and the second user may be able to modify the picture using the touch screen (e.g., may write a message on the picture using the touch screen), and send the modified picture back.

Because the communication devices 910, 920 are dedicated to one another, the user is not required to enter address or identification information when inputting a message to send to another user. They can provide input (e.g., take a picture), and the device can automatically communicate the input to the other, dedicated, device. Thus, in some cases the user can quickly and easily communicate with other users without having to first identify what user they are communicating with, and without having to write a message, speak, or provide other information, among other benefits.

In addition, the system may create or update a log of communications between devices. For example, the system may contain a data structure associated with the users within the network (such as in database 254) that stores pictures taken by both users, or catalogs, dates, and/or timestamps interactions for archival purposes. Using computing devices 252, the users may then view a history of their communications with one another, or perform other tasks using the stored pictures or other stored data. An example data structure is as follows:

TABLE 4

| User  | Time  | Picture ID |
|-------|-------|------------|
| User1 | 12:43 | Picture73  |
| User2 | 12:44 | Picture74  |
| User1 | 12:45 | Picture75  |
| User1 | 12:45 | Picture76  |

(The picture ID may be a network address of the location of the picture.) Thus, the system may log some or all communications between users, providing a history of communication that some devices, having limited capabilities, may not directly provide. For example, the devices may have limited memory (that is, they may only store one photograph at a time), and the network, via associated database components, may log any photos transmitted over the network in order to provide storage of photographs taken by the devices.

In some examples, the system may facilitate the transfer of information from one or both of the communication devices to other devices. For example, a communication device may also interface with other electronic devices (such as cell phones, computers, cameras, and so on) in order to transmit and/or receive content and other information.

Other Communication Scenarios

Figure 11:
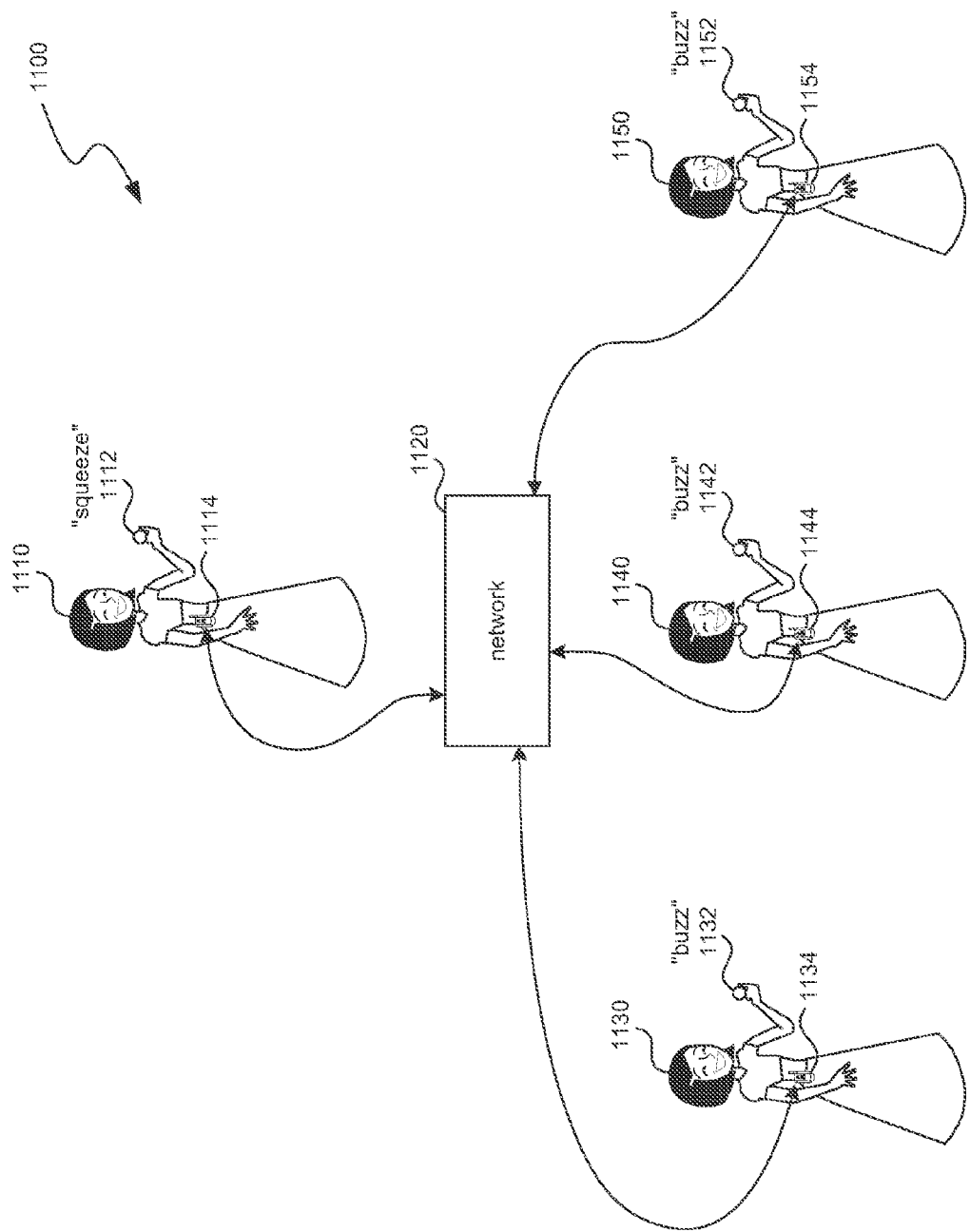
FIG. 11 is a schematic diagram illustrating a system for providing communication with a group of users sharing similar communication devices.

In some cases, three or more communication devices are contained within a dedicated group of devices. Referring to FIG. 11, a schematic diagram illustrating a system 1100 for providing communication with a group of users sharing similar communication devices is shown. The system 1100 includes a first device 1112 associated with a mobile device 1114 of a first user 1110. The first device communicates with multiple users over a network 1120, such as those described herein. For example, when the first user squeezes her communication device 1112, it sends a signal to each other device in the group and causes all other communication devices grouped to her device 1112 to buzz, including device 1132 (associated with mobile device 1134 of user 1130), device 1142 (associated with mobile device 1144 of user 1140), and device 1152 (associated with mobile device 1154 of user 1150). Thus, the user 1110 may effectively broadcast the same message to a number of different friends without having to enter each of the friends' addresses into her device 1112.

The devices may be any of the communication devices described herein, and may receive unique inputs and perform unique actions based on which user sends a message. For example, in response to the communication received from user 1110, user 1130 may squeeze her device 1132, causing the other devices 1112, 1142, and 1152 to blink. Similarly, user 1140, in response to user 1130, may then squeeze her device 1142, causing the other devices display a blue color. However, user 1140 may also tap her device, which may cause only the device 1132 of user 1130 to display a blue color (e.g., letting her know she received the message). The flow of these communications are now described.

Figure 12:
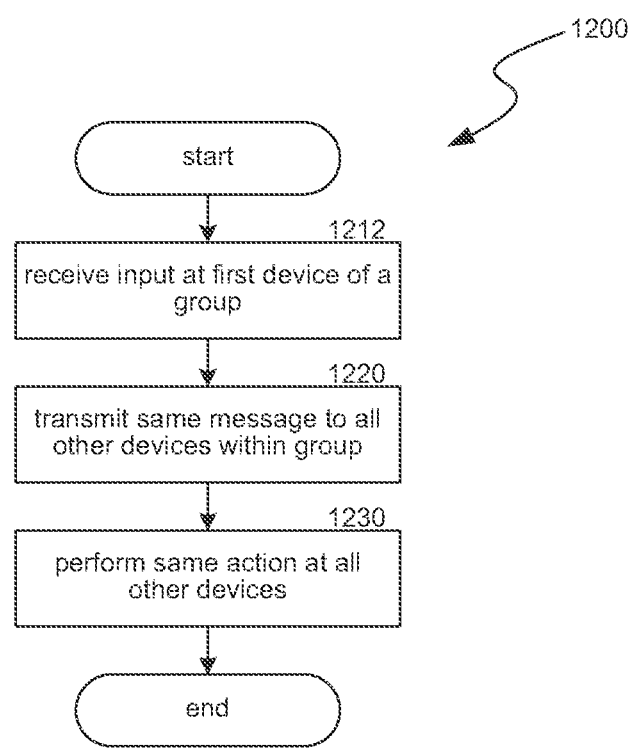
FIG. 12 is a flow diagram illustrating a routine for providing communication with a group of users sharing similar communication devices.

Referring to FIG. 12, a flow diagram illustrating a routine 1200 for providing communication with a group of users sharing similar communication devices is shown. In step 1210, a first device of a group of three or more devices receives an input from a user. For example, a first user squeezes her device. In step 1220, the first device transmits a message to the other devices in the group. For example, the first device transmits a pre-defined SMS to three other devices. In step 1230, the other devices perform an action in response to receiving the message. For example, the other three devices blink.

In some cases, actions performed by a device may be dynamically changed by a user. For example, a user's communication device may include a data port, such as a USB (universal serial bus), WiFi radio, Bluetooth component, or firewire plug, which connects the device to a user's computer. The user may then be able to program his/her device to adjust what actions the device may perform in response to certain inputs received at other devices paired with the user's device. The system, via a service provider or other provider, may provide a webpage or other access portal to users to help facilitate user configuration of his/her devices. Additionally, the access portal may allow users to access communication histories, as described herein, such as to access digital pictures taken.

In some cases, the communication devices are part of a service provider's service plan that governs use of a user's mobile device. For example, the service plan may provide a certain number of communications within the plan, and charge users a nominal fee for every additional communication, or may charge a one-time fee when a user purchases a device or pair of devices. The service provider may then monitor the communications by inserting mobile devices as intermediary communication components or via a network, as described herein.

In some cases, the communication device may be a stand alone device, and not be paired with another communication device. For example, a "mood ball" on a user's desk may change colors depending on who is calling the user. The mood ball, in communication with the user's mobile device, may glow dark red when no one is calling, and transition to a light red color when the user's spouse is calling. The ball may include a lighting device, such as various LEDs or other light emitting components, controlled by an output component. The ball informs the user that his/her spouse is calling, without alerting others of the fact (for example, when the user is in a meeting) and possibly disrupting the user or other users. Thus, the communication device may act as a lamp or other light emitting device that emits light based on information received from other devices.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the system is not intended to be exhaustive or to limit the system to the precise form disclosed above. While specific examples for the system are described above for illustrative purposes, various equivalent modifications are possible within the scope of the system, as those skilled in the relevant art will recognize. For example, while aspects of the system are described above with respect to capturing and routing digital images, any other digital content may likewise be managed or handled by the system provided herein, including video files, audio files, and so forth. While processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times.

The teachings of the system provided herein can be applied to other systems, not necessarily the system described above. The elements and acts of the various examples described above can be combined to provide further implementations of the system.

Other changes can be made to the system in light of the above Detailed Description. While the above description describes certain examples of the system, and describes the best mode contemplated, no matter how detailed the above appears in text, the system can be practiced in many ways. Details of the system may vary considerably in its specific implementation, while still being encompassed by the system disclosed herein. As noted above, particular terminology used when describing certain features or aspects of the system should not be taken to imply that the terminology is being redefined herein to be restricted to any specific characteristics, features, or aspects of the system with which that terminology is associated. In general, the terms used in the following claims should not be construed to limit the system to the specific examples disclosed in the specification, unless the above Detailed Description section explicitly defines such terms. Accordingly, the actual scope of the system encompasses not only the disclosed examples, but also all equivalent ways of practicing or implementing the system under the claims.

We claim:

1. A communication device associated with a system containing two or more communication devices, the communication device, comprising:
    a first communication device, wherein the first communication device includes:
        a first input component,
            wherein the first input component is configured to receive a single, tactile input from a first user;
        a first message transmission component,
            wherein the first message transmission component is configured to only send a first pre-defined message to a first pre-defined address associated with a second communication device in response to receiving the single input from the first user via the first input component,
            wherein the first pre-defined address is selected from one of multiple available addresses;
        a first output component,
            wherein the first output component is configured to only perform a single action in response to receiving a second pre-defined message from the second communication device; and
        a first housing for at least partially enclosing the first input component, the first message transmission component, and the first output component, wherein the housing does not carry an audio input device or an audio output device,
    wherein the second communication device paired to the first communication device, and
    wherein the first and second communication devices wirelessly communicate via IEEE 802.15 communications, Bluetooth personal area networking communications, piconet communications, ZigBee communications, or nearfield communications.

2. The communication device of claim 1, wherein the first and second communication devices are sold as a set with the first and second pre-defined addresses, and wherein no additional monthly wireless service charges need be paid for the first and second communication devices to communicate with one another.

3. The communication device of claim 1, wherein the first communication device performs a first action in response to receiving the second pre-defined message from the second communication device and the second communication device performs a second, different action in response to receiving the first pre-defined message from the first communication device.

4. The communication device of claim 1, wherein the first and second communication devices are pieces of jewelry or garments.

5. The communication device of claim 1, wherein the second communication device is a lamp, vase, sculptural element, digital picture frame, or desk accessory.

6. The communication device of claim 1, wherein the first and second communication devices include nearfield communications components and the first pre-defined message and the second pre-defined message are exchanged between the first and second communication devices using nearfield communications.

7. The communication device of claim 1, wherein the first input component includes a rotation element, a button, and a touch screen.

8. The communication device of claim 1, wherein the first communication device includes a camera.

9. The communication device of claim 8, wherein the first communication device includes a communication component configured to transmit a photograph taken by the camera to the second communication device over a network.

10. In a system of two communication devices for use with a wireless cellular telecommunications network, an apparatus consisting essentially of:
    a first wireless communication device, wherein the first wireless communication device includes:
        a first input component that receives input from a user of the first wireless communication device;
        a first output component that provides a single human-perceptible output for a user of the first wireless communication device,
            wherein the single human-perceptible output is a tactile output or a non-text output,
        a first data storage, processing and communication component that is configured to at least:
            store a single electronic address,
            receive transmitted information from a second wireless communication device,
            process a received input at the first input component, and in response to the received input at the first input component, transmit information from the first wireless communication device to the second wireless communication device directly or indirectly via the wireless cellular telecommunications network, wherein the single electronic address is associated with the second wireless communication device, and wherein the first wireless communication device is in communication with a first mobile device, and wherein the first wireless communication device causes the first mobile device to transmit the information to the second wireless communication device via a second mobile device in communication with the second wireless communication device;

a first power component to supply power to the first wireless communication device; and a first housing for at least partially enclosing the first input component, the first output component, the first data storage, processing and communication component, and the first power component, wherein the first and second wireless communication devices wirelessly communicate via IEEE 802.15 communications, Bluetooth personal area networking communications, piconet communications, ZigBee communications, or nearfield communications.

11. The apparatus of claim 10, wherein the first and second wireless communication devices include nearfield communication components to wirelessly communicate via nearfield communications.

12. The apparatus of claim 10, wherein the first and second wireless communication devices include a camera.

13. The apparatus of claim 10, wherein the first and second wireless communication devices include a GPS component.

14. A system for communicating non-voice based or non-text based messages from one device to another, the system comprising:

means for receiving tactile, manual, visual or image input at a first device associated with a first mobile device connected to a point-to-point network;

means for transmitting an indication of the input via a wireless connection to the first mobile device;

means for sending, via the point-to-point network, a message from the first mobile device to a second mobile device associated with a second device, wherein the message is associated with the received input, and wherein the message is one of a finite number of different messages that may be associated with a received input at the first device;

means for receiving, at the first mobile device, a message from the second mobile device, wherein the message from the second mobile device is associated with an input received at the second device;

means for transmitting, from the first mobile device to the first device, an indication of the received message from the second mobile device;

means for receiving, at the first device, an indication of the received message from the second mobile device; and means for performing an action at the first device in response to the received indication.

15. The system of claim 14, wherein the point-to-point network is a wireless personal area network.

16. The system of claim 14, wherein the means for sending, via the point-to-point network, the message from the first mobile device to the second mobile device associated with the second device includes means for wirelessly communicating via IEEE 802.15 communications, Bluetooth personal area networking communications, piconet communications, ZigBee communications, or nearfield communications.

17. A communications device comprising:

means for receiving a non-voice based and non-text based input at the communications device, wherein the non-voice based and non-text based input is received from a first operator of the communications device, wherein the non-voice based and non-text based input received at the communications device is one of a finite number of non-voice based and non-text based inputs;

means for identifying the non-voice based and non-text based input with one of the finite number of non-voice based and non-text based inputs;

means for mapping the non-voice and non-text based input received at the communications device to a selected message, wherein the selected message is one of a finite number of different selected messages that are non-voice based and non-text based messages;

means for wirelessly sending, via a wireless network, the selected message from the communications device to a second communications device, wherein the wireless network includes information is received via an IEEE 802. 15 communication, a Bluetooth personal area networking communication, a piconet communication, a ZigBee communication, or a nearfield communication;

means for receiving, at the communications device, an incoming selected message from a second communications device operated by a second user and sent through the wireless network;

means for determining an action to be performed at the communications device based on the incoming selected message received form the second communications device, wherein the action is a non-voice based and non-text based action, and means for performing, at the communications device, the action associated with the incoming selected message.

18. The communications device of claim 17, wherein the action includes emitting a colored light.

19. The communications device of claim 17, wherein the wireless network includes a personal area network and the means for wirelessly sending the selected message includes means for transmitting the selected message via nearfield communications.

* * * * *